June 15, 1965     H. T. WINCHEL     3,189,751
TIMING CIRCUIT
Filed April 1, 1960
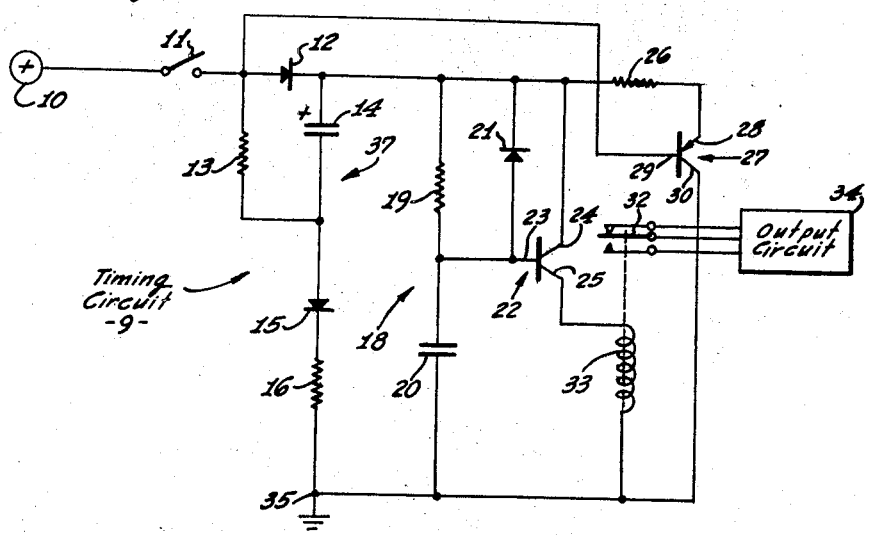
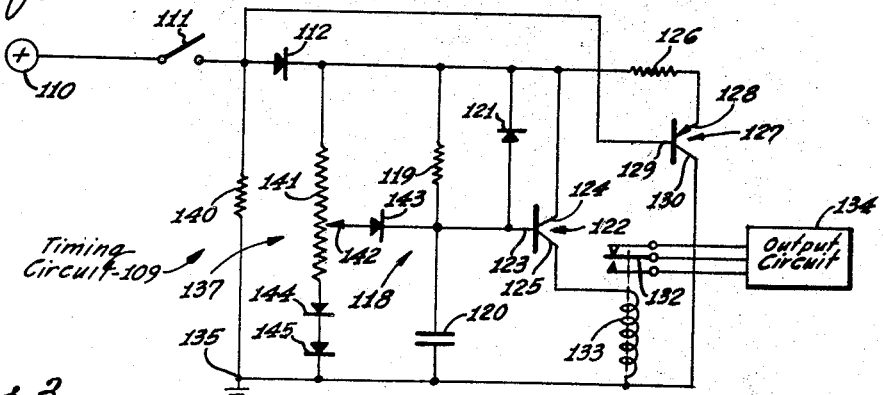
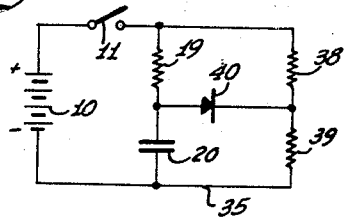
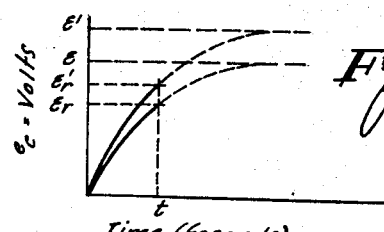
INVENTOR:
Henry T. Winchel
By Smyth, Roston & Pavitt
Attorneys

United States Patent Office 3,189,751
Patented June 15, 1965

3,189,751
TIMING CIRCUIT
Henry T. Winchel, Los Angeles, Calif., assignor to Consolidated Electronics Industries Corp., New York, N.Y., a corporation of Delaware
Filed Apr. 1, 1960, Ser. No. 19,301
12 Claims. (Cl. 307—88.5)

This invention relates to timing circuits and, more particularly, to transistor timing circuits having a short normalizing time.

There are many applications in which it is desirable to repeatedly measure with considerable accuracy a period of time during which a predetermined event is taking place. When the measured period of time is relatively lengthy, the interval required to return the timing circuit to normal in readiness for another timing period becomes also somewhat length. This is particularly true when the timing is under control of a capacitive circuit arrangement. Moreover, high speed normalization of such circuits is complicated if the predetermined event is terminated before the end of the timing period. For example, one application for a high speed normalizing timing circuit is for monitoring a pulse source of varying pulse widths. When a pulse is initiated, it starts the timing period and it is required to start a succeeding timing period either immediately after the first timing period, or immediately after the termination of the pulse which may be of shorter duration than the timing period.

In a specific illustrative embodiment of this invention, a transistor timing circuit is provided which accurately measures a period of time following the application of potential to the timing circuit. The timing period, which may illustratively be 6 seconds, is controlled by a capacitive timing circuit. At the end of the timing period, the capacitive circuit arrangement operates first transistor means which has a normal high impedance condition and an operative low impedance condition. When the first transistor means is operated, it forms a low impedance to discharge a capacitor in the capacitive circuit arrangement and to operate an output relay. The output relay provides an indication of the termination of the timing period.

Thereafter, the output relay remains operated as long as the input potential is applied to the timing circuit. When the input potential is interrupted or removed, a normalizing circuit arrangement is operated to rapidly discharge the capacitor in the capacitive circuit arrangement to return the timing circuit to normal ready for another timing sequence. Under control of the normalizing arrangement, the normalizing time may be as low as a few milliseconds. The noramlizing circuit arrangement includes second transistor means which become operative to function as a low impedance path for the capacitor of the capactive arrangement.

Other features of the invention pertain to the provision of means for maintaining the second transistor means operative even when the capacitor of the capacitive arrangement has discharged to a relatively low potential. The means includes a capacitive shunt arrangement having a relatively long discharge time constant coupled across the capacitive circuit arrangement including the timing capacitor.

Further features of this invention relate to the provision of means for rapidly normalizing the timing circuit when the input potential is interrupted before the end of a timing operation by the timing circuit. The second transistor means discharges the capacitor in the capacitive circuit arrangement even if the first transistor means is not in its operative condition.

Still further features of this invention relate to the provision of means for introducing a predetermined initial charge to the capacitor in the capacitive circuit arrangement when the input potential is applied to the timing circuit. The initial charge is established in a relatively brief interval compared to the timing interval of the circuit. During normalization or reset, the capacitor need only be discharged to the value of the initial charge. The normalization or reset value is, accordingly, relatively brief.

Further advantages and features of this invention will become apparent upon consideration of the following description when read in conjunction with the drawing wherein:

FIGURE 1 is a circuit representation of one embodiment of the timing circuit of this invention utilizing a capacitive shunt arrangement;

FIGURE 2 is a circuit representation of a second embodiment of the timing circuit of this invention utilizing initial charge means;

FIGURE 3 is a schematic diagram of a portion of the timing circuit of this invention on an equivalent circuit basis; and FIGURE 4 is a number of curves illustrating the operation of the equivalent circuit shown in FIGURE 3.

Referring first to FIGURE 1, a source 10 is adapted to provide a suitable potential to the timing circuit 9. The source 10 may be an alternating current or a direct current source. Illustratively, the source 10 may be a battery or pulse source or any other suitable means for providing a direct voltage. The source 10 has its positive output terminal connected to the movable contact of a single pole switch 11. The negative terminal, not shown, of the source 10 may be connected to a common ground connection 35. When the movable arm of a switch 11 is operated to complete a connection from the source 10, the source 10 initiates the operation of the electronic timing circuit 9 depicted in FIGURE 1 to measure a timing interval and to provide an indication at the termination of each interval. If the source 10 is a pulse source, the switch 11 functions merely as enabling means with an initiating potential being provided from the source 10 at the beginning of a pulse from the source 10.

The stationary contact of the switch 11 is connected to the anode of an asymmetrically conducting impedance device 12 which is a diode of the type 1N461. The diode 12 functions to rectify the signal from the source 10 in the event an alternating current signal is provided. The cathode of the diode 12 is coupled to a capacitive circuit arrangement 18 which includes a resistor 19 and a capacitor 20. The resistor 19 and capacitor 20 are serially connected between the cathode of the diode 12 and the common ground connection 35. The capacitive circuit arrangement 18 may have a time constant illustratively of 6 seconds with the resistor 19 having a suitable vaule such as 60 kilohms and the capacitor 20 having a suitable value such as 100 microfarads. The potential across the capacitor 20 increases at an exponential rate determined essentially by the values of the resistor 19 and the capacitor 20.

Transistor means in the form of a semiconductor 22 is connected between the cathode of the diode 12 and the junction of the resistor 19 and the capacitor 20. The semiconductor 22 may be a unijunction transistor which is a three-terminal transistor of the type manufactured by the General Electric Company and designated by the numbers 2N489 through 2N494.

The three terminals of the unijunction transistor 22 are designated respectively as the emitter 23, the base 24 and the base 25. The emitter 23 of the unijunction transistor 22 is connected to the common terminal of the resistor 19 and the capacitor 20 forming the capacitive circuit arrangement 18. The base 24 is connected to the cathode of the diode 12 and the base 25 is electrically coupled to a relay winding 33. The relay winding 33, which is connected between the base 25 and the common ground connection 35, may be of conventional type having a direct current impedance of 300 ohms and a 15 volt operating level.

The unijunction transistor 22 is not conductive during the period of time in which the capacitor 20 is being charged from the source 10. During this time, the impedance between the emitter 23 and the base 25 of the unijunction transistor 22 is quite high such as in the order of several million ohms. The impedance between the bases 24 and 25 is also somewhat high such as in the order of 10 kilohms. The impedances between the emitter 23 and the bases 24 and 25 of the unijunction transistor 22 are respectively illustrated schematically as 38 and 39 in FIGURE 3 which is an equivalent circuit of a portion of a timing circuit depicted in FIGURE 1.

After a predetermined interval, the capacitor 20 becomes sufficiently charged so that the potential at the emitter 23 of the unijunction transistor 22 exceeds the potential at its base 25. The emitter 23 and the base 25 of the transistor 22, in effect, operate in a manner equivalent to the anode and cathode of a diode so that the current is provided through the emitter 23 and the base 25 of the transistor 22. The equivalent diode of the unijunction transistor 22 is illustrated in FIGURE 3 as the diode 40. The particular instant at which the equivalent diode 40 becomes forward biased, which is the instant that the impedance conditions of the unijunction transistor 22 change, is determined by the time constant of the capacitive circuit arrangement 18.

Because of the utilization of the unijunction transistor 22, the timing interval is not dependent upon the exact magnitude of the input voltage. The reason for this independence is apparent upon consideration of FIGURES 3 and 4. In FIGURE 3, the resistors 38 and 39, which are the equivalent impedance junctions of the transistor 22, form a voltage divider between the switch 11 and the common ground connection 35. The potential at the cathode of the diode 40, accordingly, varies with the exact magnitude of the voltage from the source 10. After a predetermined charging interval, the voltage across the capacitor 20 becomes equal to the voltage at the cathode of the diode 40, and current is provided through the diode 40. In the equivalent circuit depicted in FIGURE 3, a change in the voltage of the source 10 from E to E' produces a directly proportional change in the voltage at the center of the voltage divider consisting of the impedances 38 and 39 with the result that the timing interval of the diode 40 to initiate conduction remains unchanged. FIGURE 4 illustrates further these relationships with voltages $E_r$ and $E'_r$ are the voltages at the center of the voltage divider. The mathematical expression illustrating the relationship of the various circuit parameters depicted in FIGURE 3 are as follows:

$$T \text{ (the time interval)} = (R19)(C20) \log_e \left[ 1 - \left\{ \frac{R39}{R38 + R39} \right\} \right]$$

where R19 is the resistance of the resistor 19; C20 is the capacitance of the capacitor 20; R38 is the resistance of the equivalent impedance 38; and R39 is the resistance of the equivalent impedance 39.

In this manner, a predetermined interval after the closure of the switch 11, current is initiated through the unijunction transistor 22 with it being switched from its normal high impedance condition to its operative low impedance condition. Upon the initiation of current from the emitter 23 to the base 25 of the transistor 22, the impedance between these electrodes decreases rapidly to a relatively low value in the order of several ohms. The rapid change of impedance between the bases 24 and 25 provides a voltage surge across the relay winding 33. Current is provided from the source 10 through the switch 11, the diode 12, the unijunction transistor 22 and the relay winding 33 to the common ground connection 35. Current is also provided from the capacitor 20 through the unijunction transistor because the capacitor 20 begins to discharge when the transistor 22 assumes its low impedance condition. The relay winding 33, accordingly, becomes energized and operates an associated armature 32 to provide an indication to an output circuit 34 of the termination of the interval being timed by the circuit 9.

The timing circuit 9 remains in this operative condition with the relay winding 33 energized and the unijunction circuit 22 in its low impedance condition as long as the switch 11 remains closed and an input potential is provided from the source 10. The capacitor 20 in the capacitive circuit arrangement remains charged to a potential determined by the shunting effect of the unijunction transistor 22 about the resistor 19, and the impedance of the discharge path through the transistor 22 and the winding 33.

When the switch 11 is opened or the pulse provided from the source 10 terminated, the capacitive circuit arrangement 18 is rapidly normalized or reset under control of a junction transistor 27. The transistor 27, which may be a PNP junction type transistor, becomes operative when the input potential is interrupted to provide a low impedance discharge path for the capacitor 20 in the capacitive circuit arrangement 18. The base or control electrode 29 of the transistor 27 is connected to the stationary contact of the switch 11 so that the transistor 27 is effectively controlled by the input potential. During the timing operation of the circuit 9, the emitter-base junction of the transistor 27 is reverse biased because the emitter electrode 28 is connected by a resistor 26 to the cathode of the diode 12. The emitter 28 is, accordingly, at a somewhat lower potential than is the base electrode 29 during the time that the input potential is provided from the source 10 through the switch 11 to the timing circuit 9. The resistor 26 has a relatively small resistance just sufficient to insure that the emitter base junction of the transistor 27 is reverse-biased. Illustratively, the resistor 26 may have a resistance of 10 ohms. Actually, the voltage drop across the diode 12 may be suitable without a resistor serially connected therewith to maintain a more negative potential at the emitter electrode 28 than at the base electrode 29 and the transistor 27. The collector electrode 30 of the transistor 27 is connected to the common ground connection 35 and is therefore at a negative potential with respect to the emitter electrode 28 and the base electrode 29.

When the switch 11 is opened, the potential at the base electrode 29 decreases sharply whereas the potential at the emitter electrode 28 is maintained by the capacitor 20 of the circuit arrangement 18 with the diode 12 becoming reverse-biased. The transistor 27, accordingly, becomes conductive to provide a low impedance discharge path for the capacitor 20. The discharge path for the capacitor 20 is through a diode 21, the resistor 26 and the emitter-to-collector junction of the transistor 27 to the common ground connection 35. The diode 21 may be of the type 1N461 and it becomes forward biased when the transistor 27 becomes conductive. The diode 21 is reversed biased during the timing operation of the circuit 9 and is maintained reversed biased until the input potential is terminated. The diode 21 is reversed biased until the input potential is terminated by the potential difference across the resistor 19.

In this manner, the capacitor 20 is rapidly discharged by the transistor 27. Illustratively, the transistor 27 reduces the normalizing interval to a value between 15 and 30 milliseconds. As the capacitor 20 discharges, the potential forward biasing the transistor 22 reduces until the transistor 22 returns to its normal high impedance condition. The capacitor 20 continues thereafter to discharge through the transistor 27.

To further reduce the normalizing time, a second capacitive circuit arrangement 37 is provided including a capacitor 14, a diode 15 and a resistor 16 which are serially connected between the cathode of the diode 12 and the common ground connection 35. The capacitor 14 may have a suitable value such as 6 microfarads, the diode 15 may be of the type 1N461 and the resistor 16 may have a suitable value such as 100 ohms. The junction between the capacitor 14 and the anode of the diode 15 is connected by a resistor 13 to the stationary contact of the switch 11. The resistor 13 may have a suitable value such as 5 kilohms.

The second capacitive circuit arrangement 37 functions to increase the operating time of the transistor 27 so that it remains fully saturated even when the capacitor 20 is discharged to a relatively low charge. Due to the exponential variation in the rate of discharge of the capacitor 20, the discharge of the last or low value charge generally takes place over a relatively long part of the full discharge interval. By maintaining the transistor 27 conductive, the normalizing time is then considerably reduced.

During the operation of the timing circuit 9, current is provided through the switch 11, the resistor 13, the diode 15 and the resistor 16 to the common ground connection 35. The diode 15 is, accordingly, normally forward biased during the operation of the timing circuit 9. The capacitor 14 is charged to a potential determined essentially by the voltage drop across the resistance 13. When the switch 11 is opened to terminate the input potential, the diode 12 becomes reverse biased, as indicated above, and the diode 15 in the capacitive arrangement 37 also becomes reverse biased. The diode 15 becomes reverse biased because the lower plate of the capacitor 14 is relatively negatively charged during the timing operation of the circuit 9. The discharge time constant provided by the capacitive arrangement 37 is relatively long compared to the discharge time constant of the first capacitive circuit arrangement 18. The capacitor 14 discharges through the resistor 26 and the transistor 27 back through the resistor 13 to the capacitor 14.

Because of its longer discharge time constant, the capacitive arrangement 37 functions to maintain the transistor 27 in its saturated condition even when the potential across the capacitor 20 becomes quite small. The discharge path for the capacitor 14 tends to forward bias the transistor 27 because the potential across the capacitor 14 is introduced across the emitter-base junction of the transistor 27. Though the discharge time constant of the capacitive circuit arrangement 37 is relatively long, the charging time constant is quite short because the capacitor 14 shunts the relatively high impedance 13 and the resistor 16, which is serially connected therewith, is a relatively small resistor. In this manner, the timing circuit 9 is returned by normalizing means including the transistor 27 and the second capacitive circuit arrangement 37 to its normal reset condition in a relatively brief interval. The second capacitive circuit arrangement 37 reduces the normalizing interval to less than 10 milliseconds. Though the timing circuit 9, accordingly, may be utilized to measure relatively long timing intervals, in the order of 5 to 100 seconds, depending upon the parameter of the arrangement 18, the restoration time is quite small, less than 10 milliseconds.

The transistor 27 also functions to normalize the timing circuit 9 if the input potential is interrupted before the unijunction transistor 22 is operated. In other words, if the input potential is interrupted before the end of the timing interval, the transistor 27 functions to discharge the capacitor 20 to return the circuit 9 to normal. When the input potential is interrupted, the transistor 27 is forward biased whether the transistor 22 is in its operated condition or not. If the transistor 22 is in its high impedance or normal condition when the input potential is interrupted, the emitter-to-base junction of the transistor 27 becomes forward biased and the capacitor 20 discharges through the diode 21, resistor 26, and the transistor 27 exactly in the same manner as described above. Ten milliseconds after the interruption of the input signal, the timing circuit 9 is ready for another timing operation.

In the embodiment described above in reference to FIGURE 1, a second capacitive circuit arrangement 37 is provided for further reducing the normalizing or reset time. In the embodiment depicted in FIGURE 2, a second capacitive circuit arrangement is not utilized but a compensation circuit arrangement 137 is utilized instead. Except for the compensation circuit arrangement 137, the operation of the timing circuit 109 depicted in FIGURE 2 is quite similar to that described above in reference to FIGURE 1. The various components in FIGURE 2 which are similar to corresponding components in FIGURE 1 have been given similar reference designations with the addition of 100. For example, the input potential source designation is 110 in FIGURE 2 whereas it is 10 in FIGURE 1.

When the switch 111 in FIGURE 2 is closed to initiate the timing operation, a positive potential is applied across a voltage divider arrangement including a potentiometer 141 and two diodes 144 and 145. The voltage divider, which forms part of the compensation circuit arrangement 137, is coupled between the cathode or diode 112 and the common ground connection 134. The anode of the diode 112 is coupled to the common ground connection 35 by a resistor 140. The potentiometer 141 functions to introduce a predetermined potential across the capacitor 120 of the capacitive circuit arrangement 118. The adjustable tap 142 of the potentiometer 141 is connected by a diode 143 to the junction of the resistor 119 and capacitor 120 of the arrangement 118. The resistance presented by the potentiometer 141 is much smaller than that of the resistor 119 so that an initial charge is established in a relatively small interval across the capacitor 120 compared to the timing interval of the circuit 109. Illustratively, the resistance of the potentiometer 141 between end terminals may be 1 kilohm, and the initial charge may be provided to the capacitor 120 in a few milliseconds.

After the capacitor 120 is initially charged in this manner, a further increase of potential through the charging path including the resistor 119 reverse-biases the diode 143 so that the compensation circuit arrangement 137 thereupon is effectively disconnected from the capacitive circuit arrangement 118. The timing circuit 109 thereupon functions in exactly the same manner as described above to time the interval and to provide an output indication to the circuit 135 at the termination of the interval. When the input potential is interrupted, the capacitor 120 discharges in a manner described above, through the transistor 127. The reset time is now determined by how long it takes the capacitor 120 to discharge to a relatively small value. The capacitor 120 need not fully discharge because the timing interval is initiated with an initial charge. The initial charge is greater than the residual charge on the capacitor 120 when the transistor 127 becomes non-saturated. The succeeding timing operation by the circuit 109 may be initiated when the charge across the capacitor 120 falls to the magnitude of the initial charge. The timing operation will be accurately measured in this manner even though the capacitor 120 is not fully discharged. The introduction of an initial charge also avoids the effects of polarization of the capacitor 120 because the capacitor 120 is charged by the compensation circuit arrangement 137 to a level above the polarization effects.

Although this invention has been disclosed and illustrated with reference to particular applications, the principles involved are susceptible of numerous other applications which will be apparent to persons skilled in the

I claim:
1. A timing circuit, including,
   a pulse source,
   a first capacitor having first and second terminals and having its first terminal coupled to said pulse source for providing a charge in the capacitor,
   a first transistor having a first electrode coupled to the first terminal of said capacitor and having a second electrode and a third electrode, said first transistor having a normal high impedance condition and an operative low impedance condition and being responsive to a predetermined potential across said capacitor for operating to said low impedance condition,
   an output device having a first terminal connected to the second electrode of said first transistor to become operative upon a low impedance in the first transistor, the output device having a second terminal connected to the second terminal of the capacitor,
   a second transistor having a first electrode coupled to said third electrode of said first transistor and to said source, the second transistor having a second electrode connected to said source, and the second transistor having a third electrode connected to the second terminal of said output device, said second transistor having a normally nonconductive and an operative conductive condition, and
   control means including said capacitor and coupled to said source for maintaining said second transistor in its nonconductive condition during the time a pulse is supplied from said source and for operating said second transistor to the conductive condition to discharge said capacitor at the end of a pulse from said source.

2. The timing circuit set forth in claim 1 in which the control means includes a diode having first and second terminals and coupled at the first terminal to the second electrode of the second transistor and to the source and coupled at the second terminal to the third electrode of the first transistor and in which a resistor is connected between the third electrode of the first transistor and the second electrode of the second transistor.

3. A timing circuit, including,
   an input signal source for initiating a timing operation,
   a capacitor having first and second terminals and having its first terminal coupled to said source,
   first means coupled to the capacitor and the source for obtaining a controlled charge of the capacitor to control the duration of the timing operation in accordance with the charge in the capacitor,
   first transistor means controlled by said capacitive circuit arrangement and having a first impedance condition and a second impedance condition, the first transistor means having first and second terminals and having its first terminal coupled to the first terminal of the capacitor,
   an output device having first and second terminals and having its first terminal coupled to the second terminal of said first transistor means and having its second terminal coupled to the second terminal of the capacitor, the output device being responsive to a change in the operation of said first transistor means from the first impedance condition to the second impedance condition for terminating the timing operation,
   control means coupled to said source and responsive to an interruption of the input signal from said source and coupled to the first terminal of said capacitor for obtaining a discharge of the capacitor to ready the timing circuit for another timing operation,
   said first means including an asymmetrically conducting impedance element having first and second terminals respectively coupled between said source and the first terminal of said capacitor,
   said control means including a transistor having a first electrode coupled to the first terminal of said asymmetrically conducting impedance element,
   a second electrode coupled to the second terminal of said asymmetrically conducting impedance element so that the potential across said element functions to bias said transistor, and
   a third electrode coupled to the second terminal of said output device.

4. A timing circuit, including,
   an input signal source for initiating a timing operation,
   a capacitor having first and second terminals and having its first terminal coupled to said source for controlling the duration of the timing operation,
   first transistor means having first and second terminals and having a first impedance condition and a second impedance condition and having its first terminal connected to the first terminal of the capacitor, the first transistor means being controlled by the potential across the capacitor for producing a change in the operation of the first transistor means from the first impedance condition to the second impedance condition upon the occurrence of a particular charge in the capacitor,
   an output device having first and second terminals and having its first terminal coupled to the second terminal of said first transistor means and having its second terminal coupled to the second terminal of the capacitor, the output device being responsive to a change in the operation of said first transistor means from the first impedance condition to the second impedance condition for terminating the timing operation,
   means coupled to the source and to the first terminal of the capacitor and responsive to the interruption of the signal from said source for discharging said capacitor to rapidly normalize the limiting circuit, and
   circuit means coupled between said source and the first terminal of said capacitor and responsive to the initiation of an input signal from said source for instantaneously introducing a predetermined initial charge to said capacitor to institute the timing operation.

5. A timing circuit, including,
   an input signal source for initiating a timing operation,
   a capacitor having first and second terminals and having the first terminal coupled to said source,
   first means coupled to the capacitor and to the source for providing a charge in the capacitor to control the duration of the timing operation in accordance with the charge across the capacitor, the first means and the capacitor having a particular charging time constant,
   first transistor means having first and second terminals and having a normal high impedance condition and an operative low impedance condition and having its first terminal coupled to the first terminal of the capacitor, the first transistor means being responsive to the charge across the capacitor for producing a change in the operating condition of the first transistor means from the high impedance condition to the low impedance condition upon the occurrence of a particular charge across the capacitor.
   an output device having first and second terminals and having its first terminal coupled to the first terminal of said first transistor means and having its second terminal coupled to the second terminal of the capacitor, the output device being responsive to the operation of said first transistor means in the low impedance condition for terminating the timing operation,
   means operatively coupled to the source and to the first terminal of the capacitor and responsive to the interruption of the signal from said source for discharging said capacitor to rapidly normalize the timing circuit, and circuit means coupled between said source and said capacitor and responsive to the initiation of an input signal from said source for introducing a predetermined initial charge to said capacitor, said circuit means together with said capacitor of said capacitor means having a charging time constant smaller than the particular charging time constant of said capacitor means so as to rapidly introduce an initial charge to said capacitor.

6. A timing circuit, including, an input signal source for initiating a timing operation, a capacitor having first and second terminals and having the first terminal coupled to said source, means coupled to the capacitor and to the source for providing a charge in the capacitor to control the duration of the timing operation in accordance with the charge in the capacitor, first transistor means having first and second terminals and having a first impedance condition and a second impedance condition and having its first terminal coupled to the first terminal of the capacitor, the first transistor means being responsive to the charge across the capacitor for providing a change in the operation of the first transistor means upon the occurrence of a particular charge in the capacitor, an output device having first and second terminals and having its first terminal coupled to the second terminal of said first transistor means and having its second terminal coupled to the second terminal of said capacitor, the output device being responsive to a change in the operation of said first transistor means from the first impedance condition to the second impedance condition for terminating the timing operation, means operatively coupled to the source and to the first terminal of the capacitor and responsive to the termination of a signal from said source for discharging said capacitor to rapidly normalize the timing circuit, and circuit means coupled between said source and the first terminal of said capacitor and responsive to the initiation of an input signal from said source for introducing a predetermined initial charge to said capacitor, said circuit means including an asymemtrically conducting impedance element connected to the first terminal of said capacitor for electrically isolating said circuit means from said capacitor after the introduction of the predetermined initial charge to said capacitor.

7. A timing circuit, including, a timing capacitor having first and second terminals, means coupled to the timing capacitor for providing a charge in the timing capacitor to control the duration of the interval timed by the timing circuit, a control member having first and second states of operation and having first and second terminals and having its first terminal coupled to the first terminal of said capacitor, the control member being responsive to a particular potential from said capacitor for changing from the first state of operation to the second state of operation to terminate the timing by the timing circuit, control means coupled to the first terminal of said capacitor and responsive to an interruption in the charging of the capacitor for rapidly discharging said capacitor to return the timing circuit to normal, circuit means coupled to said control means and to the first terminal of said capacitor for disabling the operation of said control means during the time said capacitor is being charged to control the duration of the interval being timed by the timing circuit, output means having first and second terminals respectively coupled to the second terminals of the control member and the capacitor to provide an output indication during the operation of the control member in the second state, and capacitive circuit means coupled to said control means for providing for a discharge of said capacitor by said control means for a particular interval to obtain a full discharge of said capacitor, said capacitive circuit means having a discharge time constant greater than the discharge time constant provided for said capacitor by said control means.

8. A timing circuit, including, a pulse source, a capacitor having first and second terminals, means coupled to the capacitor and to said pulse source for providing a charge of the capacitor, a control member having a first terminal coupled to the first terminal of said capacitor and having a second terminal and having first and second states of operation, the control member being responsive to a particular potential across said capacitor for providing a change in its operation from the first state to the second state, means coupled to said source and to the first terminal of said capacitor and responsive to an interruption in the pulse from said source and controlled by the potential across said capacitor for discharging said capacitor, control circuit means coupled to said discharging means for maintaining the duration of operation of said discharging means for a particular interval to insure the full discharge of said capacitor, and output means having first and second terminals respectively coupled to the second terminals of the control member and the capacitor for providing an output indication during the operation of the control member in the second state.

9. A timing circuit, including, a pulse source, a capacitor having first and second terminals, means coupled to said pulse source and to said capacitor for providing a charge across the capacitor, a control member having a first terminal coupled to the first terminal of said capacitor and having a second terminal, the control member having first and second states of operation and being responsive to a particular potential across said capacitor to become changed from the first state of operation to the second state of operation, means coupled to said source and to the first terminal of said capacitor and responsive to an interruption in the pulse from said source and controlled by the potential across said capacitor for discharging said capacitor, control circuit means coupled to said discharging means for maintaining the duration of operation of said discharging means for a particular interval to insure the full discharge of said capacitor, said control circuit means including a second capacitor having first and second terminals, first circuit means coupling the first terminal of said second capacitor to said source for charging said second capacitor during the time a pulse is supplied by said source to the first capacitor, second circuit means connecting the second terminal of said second capacitor to said discharging means upon an interruption in the pulse from the source, and output means having first and second terminals respectively coupled to the second terminals of the control member and the first capacitor for providing an output indication upon an operation of the control member in the second state.

10. A timing circuit, including, a source of potential for initiating a timing operation, a first capacitor having first and second terminals, means coupled to the first capacitor and to said source and responsive to the potential from said source for providing a charge of the capacitor to control the duration of the timing operation, a first control member having first and second states of operation and having a first terminal coupled to the first terminal of said first capacitor and having a second terminal, the first control member being controlled by said first capacitor for changing from the first state of operation to the second state of operation upon the occurrence of a particular charge in the first capacitor to provide an indication of the termination of the timing operation, an output member having first and second terminals respectively coupled to the second terminals of the first control member and the first capacitor to provide an output indication upon an operation of the control member in the second state, a second control member having a first terminal coupled to said source and having a second terminal coupled to said first capacitor, the second control member being responsive to an interruption of the potential from said source for discharging said first capacitor to return the first capacitor to normal, and means coupled to said source and to the second terminal of the said second control member and responsive to an interruption of the potential from the source for expediting the return of the charge across the capacitor to a particular value to initiate a new timing operation.

11. The combination set forth in claim 10 in which the expediting means includes a second capacitor having a first terminal coupled to the pulse source to become charged by the source and having a second terminal coupled to the second terminal of the second control member to maintain the conductivity of the second control member for the discharge of the first capacitor upon an interruption in the voltage from the source.

12. The combination set forth in claim 10 in which the expediting means includes means coupled to the first terminal of the first capacitor for providing a low impedance during charges in the first capacitor below a particular value and coupled to the potential source for providing a large charging current to the capacitor until the occurrence of the particular charge in the capacitor.

References Cited by the Examiner

UNITED STATES PATENTS

| | | | |
|---|---|---|---|
| 2,927,259 | 3/60 | Neal | 307—88.5 |
| 2,947,916 | 8/60 | Beck | 307—88.5 |
| 2,968,770 | 1/61 | Sylvan | 307—88.5 |
| 3,026,485 | 3/62 | Suran | 307—88.5 |
| 3,045,150 | 7/62 | Mann | 307—88.5 |

ARTHUR GAUSS, *Primary Examiner.*

HERMAN KARL SAALBACH, JOHN W. HUCKERT, GEORGE N. WESTBY, *Examiners.*